Feb. 14, 1950 R. H. AHRENS 2,497,389
LIQUID COOLING DEVICE
Filed Aug. 22, 1947 3 Sheets-Sheet 1

INVENTOR
Richard H. Ahrens
By Fishburn & Mullendore
ATTORNEYS

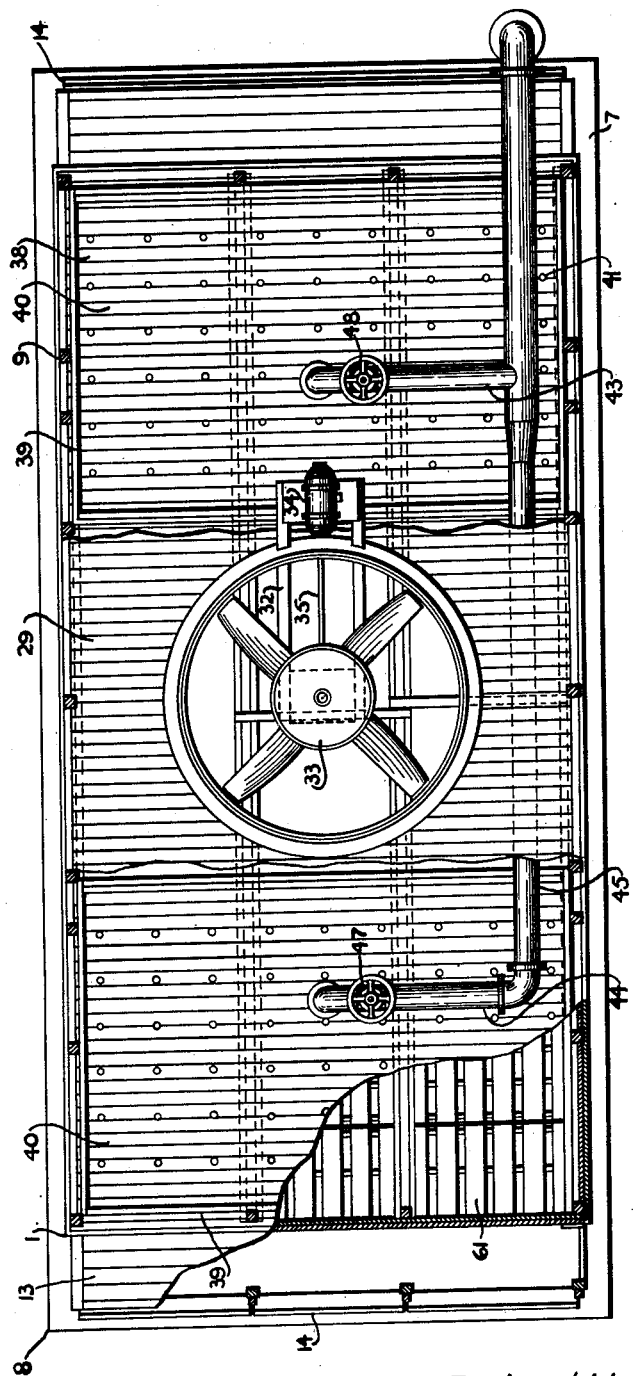

Feb. 14, 1950 — R. H. AHRENS — 2,497,389
LIQUID COOLING DEVICE
Filed Aug. 22, 1947 — 3 Sheets-Sheet 3
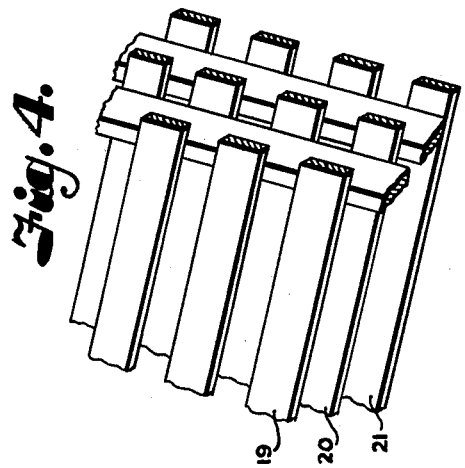
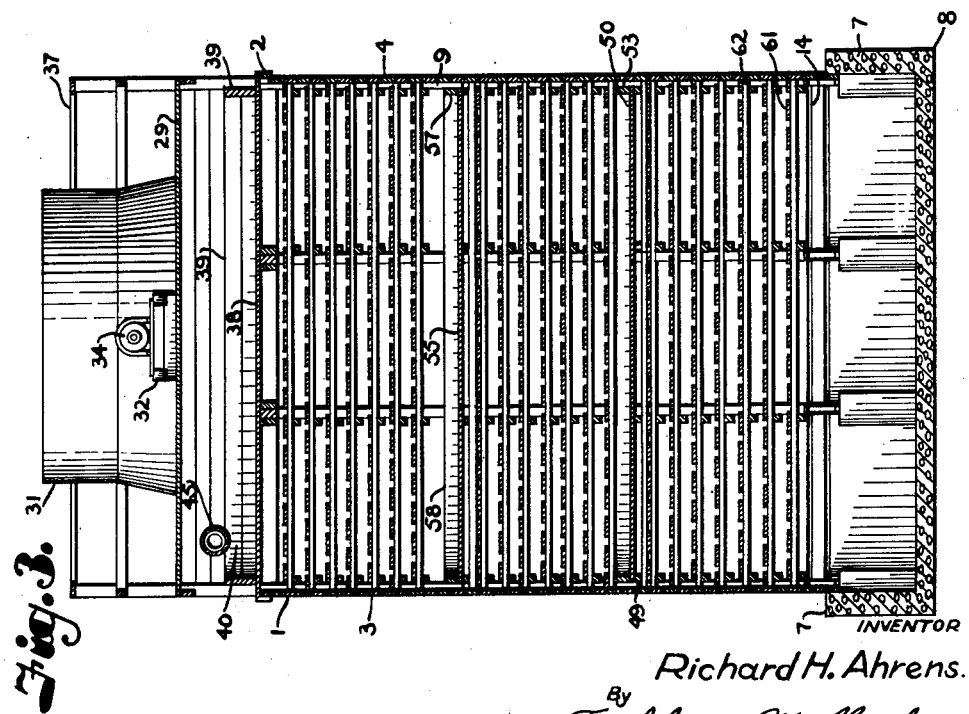
INVENTOR
Richard H. Ahrens.
By Fishburn + Mullendore
ATTORNEYS Patented Feb. 14, 1950

2,497,389

UNITED STATES PATENT OFFICE 2,497,389

LIQUID COOLING DEVICE

Richard H. Ahrens, Olathe, Kans.

Application August 22, 1947, Serial No. 770,087

2 Claims. (Cl. 261—111)

This invention relates to liquid cooling devices commonly known as cooling towers because of the tower-like height which has been necessary in obtaining the desired dispersion and contact of falling droplets of liquid with a countercurrent stream of substantially high velocity air. Such cooling towers because of their height have been expensive to construct and the operating cost has been high because of the pumping head required in raising the liquid to be cooled to the top of the structure. The wind resistance to such towers has required substantial bracing and expensive construction.

It is, therefore, the principal object of the present invention to provide an efficient and economically operable cooling device which is of substantially low construction and yet provides the desired dispersion and time contact of the liquid with a forced flow of air.

A further object of the invention is to provide a cooling device wherein the air stream is caused to flow in a tortuous or zigzagged path through falling droplets of liquid, thereby providing a plurality of prolonged contact stages in which the air is moved transversely of the falling droplets.

Other objects of the invention are to provide for collection and distribution of the liquid between each contact stage and to provide a structure wherein the liquid collecting and distributing means directs the tortuous flow of air through the cooling chamber.

A further object of the invention is to provide a plurality of liquid dispersion decks in each passageway along which the air moves transversely to the fall of liquid from deck to deck.

In accomplishing these and other objects of the invention, I have provided improved structure, the preferred form of which is illustrated in the accompanying drawing wherein:

Fig. 2 is a plan view of the cooling device with parts broken away to better illustrate the construction.

Fig. 3 is a cross section through the cooling device on the line 3—3 of Fig. 1.

Fig. 4 is an enlarged sectional perspective view of the mist extracting baffles that are disposed between the cooling and air discharge chambers.

Figure 1:
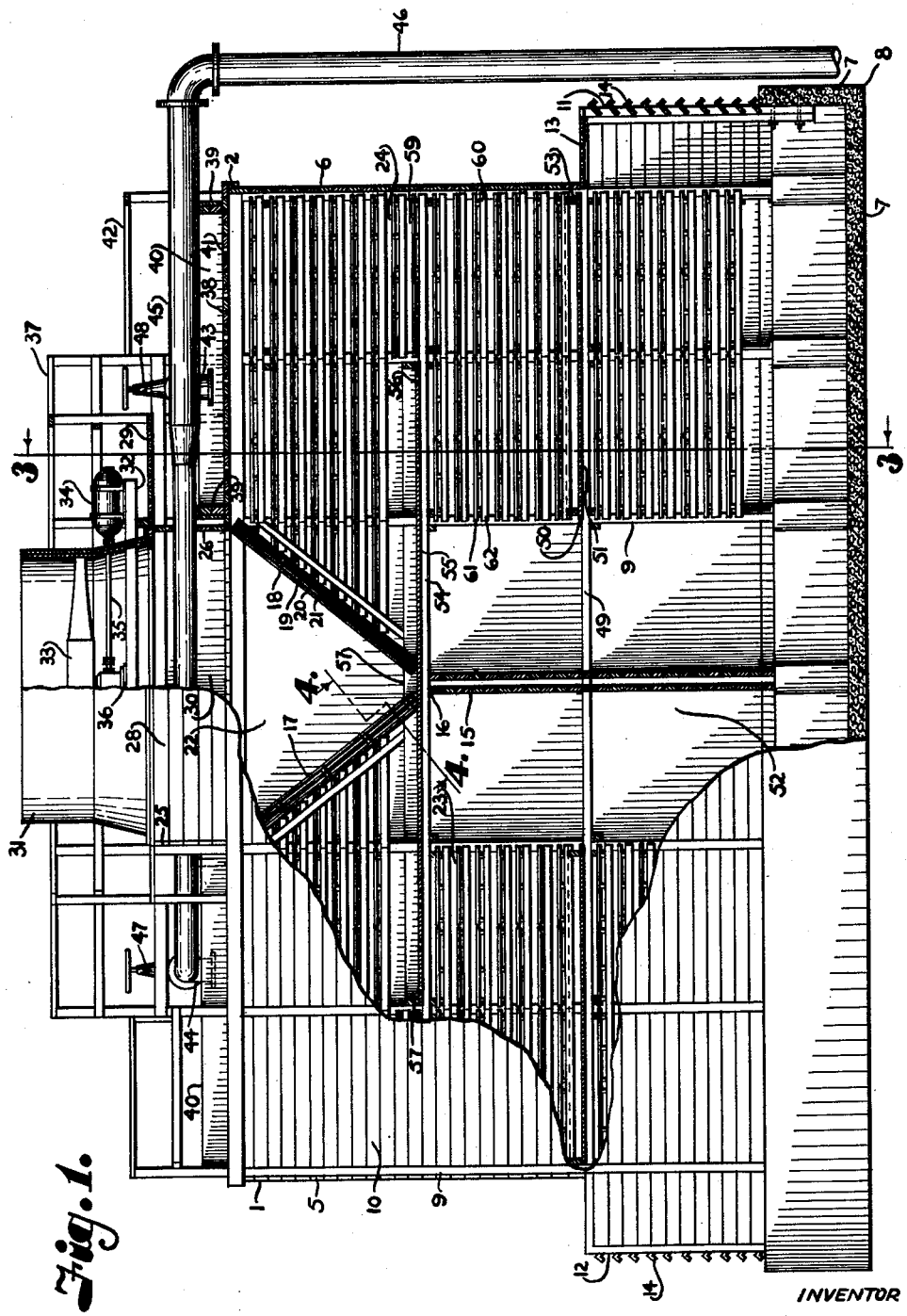
Fig. 1 is a side elevational view of a liquid cooling device constructed in accordance with the present invention, parts of the side walls being broken away to better illustrate the interior structure.

Referring more in detail to the drawings:

1 designates a cooling device constructed in accordance with the present invention and which includes a casing 2 having relatively low side walls 3 and 4, and end walls 5 and 6 supported above corresponding walls 7 of a liquid collecting basin 8. The side walls may be formed of suitable material such as wood and include spaced uprights 9 to which are attached siding 10 to form completely closed sides.

The end walls 5 and 6 may be similarly formed but the lower edges terminate short of the lower edges of the side walls 3 and 4 to provide air inlet openings 11 and 12 at the base of the structure and which preferably extend across the full width of the casing. The inlets preferably are covered by lateral extensions 13 at the base of the side walls and which extensions are connected across the inlets by a vertical series of transverse baffles 14 as best shown in Fig. 1.

Extending transversely of the casing midway between the end walls is a partition 15 that terminates below the upper edges of the side walls as indicated at 16 and diverging upwardly and outwardly therefrom are mist extractors 17 and 18, each of which includes a spaced inner, outer and intermediate series of spaced baffles 19, 20 and 21 with the baffles staggered with respect to each other for diverting the air sufficiently to effect removal of any entrained moisture as later described. The diverging mist extractors thus form the lower portion of an air discharge chamber 22 which is common to cooling chambers 23 and 24 located on the respective sides of the partition 15. The upper portion of the air discharge chamber is formed by upward extensions 25 and 26 of the side walls of the casing and transverse walls 27 and 28 extending upwardly from the terminal ends of the mist extractor as shown in Fig. 1.

Supported above the discharge chamber is a horizontal deck 29 having a central opening 30 encircled by a fan housing or guard 31. Mounted in the fan housing on suitable transverse beams 32 is a fan or blower 33 that is operated externally of the fan housing by means of an electric motor 34. The electric motor is connected by suitable shafting 35 with a reduction gearing connected in the supporting base 36 of the fan as in conventional practice. The fan housing is open at the top for the free discharge of air at substantial velocity.

The deck may be provided with a suitable railing 37 extending therearound for the safety and convenience in servicing of the fan and its operating mechanism.

The top of each cooling chamber is covered by a deck 38 that extends from one side wall to the other of the casing and from the end walls of the discharge chamber to the end walls of the casing as best shown in Figs. 1 and 2. The sides and ends of the deck are provided with upstanding rails or curbings 39 which cooperate therewith in forming relatively shallow liquid distributing pans 40 in which the liquid to be cooled is discharged for gravitational flow through a plurality of apertures 41 formed in the deck or bottom of the pans. The decks forming the bottoms of the pans may also be provided with suitable hand rails 42 which cooperate with the hand rails of the upper deck as shown in Fig. 1.

The liquid to be cooled is delivered to substantially the center of the respective pans through ducts 43 and 44 that are connected by a manifold 45 which is connected with a downpipe 46 leading to the source of liquid supply and through which liquid is delivered under sufficient pump pressure to raise the liquid to the distribution pans.

The ducts may be provided with suitable shut-off or control valves 47 and 48 as shown in Figs. 1 and 2. Extending longitudinally of the casing substantially in registry with the top of the air inlet openings are joists 49 for supporting a deck 50 having apertures 51 similar to the top deck 38. The deck 50 extends from the end walls of the casing inwardly toward the partition 15 but terminates short thereof to provide vertical passageways 52 on the respective sides of the partition. The sides of the deck 50 are also provided with upstanding rails or curbings 53 so as to form substantially shallow liquid collecting and distributing pans corresponding to the distributing pans previously described at the top of the tower. Also extending longitudinally of the casing at substantially the top of the partition 15 are similar joists 54 carrying a deck 55 having apertures 56 for passing streams of liquid as later described. The deck 55 has upwardly extending side and end rails 57 similar to the other decks to provide liquid collecting and distributing pans 58. The deck 55 extends from the partition 15 toward the end walls but terminates short thereof to provide air passageways 59 therebetween. It is thus obvious that the liquid cooling and distributing pans are arranged in the cooling chambers in vertically staggered relation so as to provide tortuous passageway for flow of air from the inlet to the discharge chamber thereby prolonging travel of the air and effecting lateral movement thereof across the path of the dropping liquid as later described.

In order to disperse the streams of liquid into droplets as the streams are discharged from the respective distributing pans, each horizontal portion of the tortuous passageway is provided with a superimposed series of liquid dispersing decks 60 which comprise a series of slat-like sections 61 carried on longitudinal joists 62. The liquid dispersing decks at the upper section of the tortuous passageway extend from the end walls 5 and 6 to the inclined mist extractors 17 and 18, however, the lower decks merely extend from the end walls of the casing to the vertical passageways 52 formed at the inner ends of the lower distributing pans as shown in Fig. 1.

In operation liquid to be cooled is delivered to the upper distributing decks or pans 40 and the liquid discharged from the ducts 43 and 44 spreads outwardly over the bottoms of the distributing pans and flows downwardly in a plurality of streams through the apertures 41 onto the upper section of liquid dispersing decks which break the streams into a plurality of droplets which fall from deck to deck to be collected in the next lower liquid distributing pan. Some of the droplets will fall through the passageways 59 and be collected directly in the lowermost distributing pans.

The liquid after being collected in the lower pan is distributed in a plurality of streams and falls in like manner to the underlying liquid dispersing decks and into the collecting basin.

Simultaneously with fall of the liquid, air streams are being drawn by the fan 33 through the inlet openings 11 and 12 to travel longitudinally of the lower section of decks and thence reversely through the next upper tier to the opening 59 where the streams of air again change direction and travel through the uppermost tier of decks for discharge between the baffles of the mist extractors into the discharge chamber and from which the air is discharged at substantially high velocity through the outlet of the fan housing.

While the casing is relatively low in height the arrangement of the liquid collecting and distributing pans provide a tortuous passageway for the prolonged flow of air across the path of the droplets of liquid moving downwardly through the cooling chamber.

In a cooling device constructed as described there is at all times a constant difference in temperature between wet bulb temperature of the air and the temperature of the water at any point throughout the air travel.

Attention is also directed to the fact that the liquid collecting and dispersing pans provide for stage cooling of the liquid.

From the foregoing it is obvious that I have provided an efficient and economically operable structure in that the head of liquid is relatively low and that that air is caused to move in prolonged contact with the droplets of liquid being cooled. It is also obvious that I have provided a more efficient cooling of the liquid by dispersing and distributing the liquid throughout the respective contact stages thereby bringing the air into more effective contact with the liquid and assuring the desired cooling effect in a shorter travel of the liquid.

What I claim and desire to secure by Letters Patent is:

1. A liquid cooling device of the character described including a casing having spaced side walls and end walls connecting the side walls, said end walls being provided with air inlet openings in the lower portions of said end walls and the upper portions of said end walls being closed above said inlet openings, a partition extending transversely within the casing intermediate said end walls to divide the casing into cooling chambers disposed on opposite sides of said partition, said partition terminating short of the top of said walls, mist extracting baffles diverging above the top of said partition and forming a single air discharge chamber in connection with both cooling chambers, liquid distributing means at the top of the cooling chambers for distributing liquid to be cooled for gravitational flow into the cooling chambers in a plurality of streams, a liquid distributing and air directing means extending substantially horizontally of the upper end of the partition into each cooling chamber and terminating short of the closed upper portions of the respective end walls, lower liquid distributing and air directing means extending from said end walls above the air inlets and terminating short of the partition to cooperate with the other liquid distributing and air directing means and form tortuous passageways for flow of air from said inlets to said outlet chamber, a plurality of superimposed liquid dispersing decks extending transversely of the cooling chamber below the upper liquid distributing and air directing means and between the end walls and said baffles, similar decks extending from said end walls above and below said last named liquid distributing and air directing means, means forming an outlet for said air discharge chamber, a fan in said outlet forming means for effecting movement of air through the cooling chambers at substantial velocity, and means providing a liquid collecting basin below said chambers.

2. A liquid cooling device of the character described including a casing having spaced side walls and end walls connecting the side walls, said end walls being provided with air inlet openings in the lower portions of said end walls and the upper portions of said end walls being closed above said inlet openings, a partition extending transversely within the casing intermediate said end walls to divide the casing into cooling chambers disposed on opposite sides of said partition, said partition terminating short of the top of said walls, mist extracting baffles diverging above the top of said partition and forming an air discharge chamber in connection with both cooling chambers, liquid distributing means at the top of the cooling chambers for distributing liquid to be cooled for gravitational flow into the cooling chambers in a plurality of streams, a liquid distributing and air directing means extending substantially horizontally of the upper end of the partition into each cooling chamber and terminating short of the closed upper portions of the respective end walls, lower liquid distributing and air directing means extending from said end walls above the air inlets and terminating short of the partition to cooperate with the other liquid distributing and air directing means and form tortuous passageways for flow of air from said inlets to said outlet chamber, a plurality of superimposed liquid dispersing decks extending transversely of the cooling chamber below the upper liquid distributing and air directing means and between the end walls and said baffles, similar decks extending from said end walls above and below said last named liquid distributing and air directing means and terminating short of said partition, means forming a common outlet for said air discharge chamber, a fan in said outlet forming means for effecting movement of air through the cooling chambers at substantial velocity, and means providing a liquid collecting basin below said chambers.

RICHARD H. AHRENS.

REFERENCES CITED

The following references are of record in the file of this patent:

UNITED STATES PATENTS

| Number | Name | Date |
| --- | --- | --- |
| 813,066 | Voorhees | Feb. 20, 1906 |
| 1,671,110 | Gibson | May 29, 1928 |
| 2,157,070 | Coey | May 2, 1939 |
| 2,191,938 | Mart | Feb. 27, 1940 |
| 2,247,514 | Mart | July 1, 1941 |

FOREIGN PATENTS

| Number | Country | Date |
| --- | --- | --- |
| 408,295 | Germany | Jan. 19, 1925 |